United States Patent
Aoki et al.

(10) Patent No.: US 11,875,530 B2
(45) Date of Patent: Jan. 16, 2024

(54) IMAGE DISPLAY SYSTEM AND IMAGE CONTROLLER

(71) Applicant: TOYOTA JIDOSHA KABUSHIKI KAISHA, Aichi-ken (JP)

(72) Inventors: Takayuki Aoki, Toyota (JP); Hideki Kobayashi, Miyoshi (JP); Ryusuke Ohta, Toyota (JP); Tomohiro Inada, Kariya (JP); Hitoshi Muraki, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/991,181

(22) Filed: Nov. 21, 2022

(65) Prior Publication Data
US 2023/0162390 A1    May 25, 2023

(30) Foreign Application Priority Data
Nov. 22, 2021   (JP) .................................. 2021-189236

(51) Int. Cl.
G06T 7/73        (2017.01)
G09G 3/00        (2006.01)
G02B 27/01       (2006.01)

(52) U.S. Cl.
CPC ............ *G06T 7/73* (2017.01); *G02B 27/0172* (2013.01); *G09G 3/001* (2013.01); *G02B 2027/0178* (2013.01); *G06T 2207/30204* (2013.01); *G06T 2207/30268* (2013.01); *G09G 2340/0464* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2018/0046874 A1* | 2/2018 | Guo ..................... | G06V 10/507 |
| 2021/0118192 A1 | 4/2021 | Seto et al. | |
| 2021/0124174 A1* | 4/2021 | Tokunaga ................. | G06T 7/80 |
| 2021/0341995 A1* | 11/2021 | Wood ..................... | B64D 47/08 |

FOREIGN PATENT DOCUMENTS

| | | |
|---|---|---|
| JP | 2017129406 A | 7/2017 |
| JP | 202164906 A | 4/2021 |

* cited by examiner

*Primary Examiner* — Nicholas J Lee
(74) *Attorney, Agent, or Firm* — HAUPTMAN HAM, LLP (57) ABSTRACT

An image display system includes a display configured to be attached to the head of a user who is an occupant of a vehicle, to display a subject image to be superimposed on a field of vision of the user; a SLAM camera fixed to the display to capture a SLAM image of surroundings of the display; one or more light on-vehicle displays disposed within a vehicle cabin to emit light that serves as an AR marker; and an image controller configured to determine a display position of the subject image based on the SLAM image including the AR marker.

11 Claims, 11 Drawing Sheets

IMAGE DISPLAY SYSTEM AND IMAGE CONTROLLER

CROSS REFERENCE TO RELATED APPLICATION

This application claims priority to Japanese Patent Application No. 2021-189236 filed on Nov. 22, 2021, which is incorporated herein by reference in its entirety including the specification, claims, drawings, and abstract.

TECHNICAL FIELD

The present description discloses an image display system that displays a subject image to be superimposed on a field of vision of a user or an occupant of a vehicle and to an image controller.

BACKGROUND

A technique for displaying a predetermined image to be superimposed on a user's field of vision in such a manner as to allow the user to see a virtual object represented by the image as if the virtual object actually exists has been known. Patent Document 1, for example, discloses a technique of displaying, on smart glasses or a glasses-type display worn by a driver, an image of a leading vehicle that the driver's vehicle is following. In Patent Document 1, the leading vehicle expressed by the image moves to guide the driver's vehicle to a destination. This technique enables the driver to travel to the destination by operating the vehicle so as to follow the leading vehicle.

CITATION LIST

Patent Literature

[Patent Document 1] JP 2017-129406 A

SUMMARY

To enable a user to recognize a virtual object as if the virtual object were actually present, it is necessary to determine the position of an image of the virtual object to be displayed on the display (hereinafter referred to as a "subject image") based on the position of the virtual object represented by the subject image in the real space and the position of the display in the real space.

In Patent Document 1, to identify the position of the display in the real space, a special marker is disposed on a dashboard, and a camera is attached to the display. The position of the display in the actual space is identified based on an image of a scene including the marker that is captured by the camera. The use of a marker as in the technique in Patent Document 1 enables detection of the position of the display in the real space with less computation.

In Patent Document 1, however, the marker is a physical marker, an object that actually exists. How such a physical marker is viewed significantly depends on the surrounding light environmental condition, such as illuminance or color temperatures. This may result in failure to detect the position of the physical marker from the image of the physical marker captured by the camera on the display. For example, an image of the physical marker captured in a dark environment such as at nighttime may be blacked out, or, in contrast, an image of the physical marker captured under strong sunlight may be whited out. In either case, detection of the position of the physical marker may be unsuccessful. Failure to detect the positon of the physical marker inevitably results in failure to detect the position of the display in the real space, further resulting in failure to determine the appropriate display position of the subject image.

An aspect of the disclosure is therefore aimed toward an image display system that enables more appropriate determination of the display position of a subject image, and an image controller.

In accordance with an aspect of the disclosure, an image display system includes a display configured to be attached to the head of a user, an occupant of a vehicle, to display a subject image to be superimposed on a field of vision of the user; a SLAM camera fixed to the display to capture a SLAM image of surroundings of the display; one or more light emitters disposed within a vehicle cabin, to emit light that serves as a marker; and an image controller configured to determine a display position of the subject image based on the SLAM image including the marker.

A marker created by emitted light can be detected in dark environments, such as at nigh time. This configuration enables reliable identification of the position of the display in real space and thus enables more appropriate identification of the display position of the subject image.

In this configuration, the light emitter may be an on-vehicle display disposed within the vehicle cabin to display an image, and the marker may be an image displayed in a display area of the on-vehicle display.

This configuration enables changing the shape, position, or brightness, for example, of the marker as desired. This enables providing a marker suitable for the environment within the vehicle to thereby enable further reliable identification of the display in real space.

The marker has a marker display condition including at least one of a luminance, a color, or a brightness, and the marker display condition may be variable.

Changing the brightness of the marker, for example, increases detectability of the marker, which enhances appropriate determination of the display position of the subject image.

In the above configuration, the marker display condition may be changed in accordance with environmental light conditions in the vicinity of the light emitter.

Changing the display condition of the marker in accordance with an environmental light condition increases detectability of the marker, which again enhances appropriate determination of the display position of the subject image.

The image display system may further include a light environment sensor configured to detect the environmental light condition in the vicinity of the light emitter, and the image controller may be configured to specify the environmental light condition in the vicinity of the light emitter based on a detection result of the light environment sensor.

The light environment sensor enables accurate detection of the environmental light condition surrounding the light emitter. This still further enhances appropriate setting of the display condition of the marker.

The image controller may be configured to specify the environmental light condition in the vicinity of the light emitter based on at least one of date and time, an illuminating state of a light of the vehicle, or the SLAM image.

This configuration enables detection of the environmental light condition surrounding the light emitter without employing the light environment sensor.

The image controller may be configured to change the marker display condition in accordance with the SLAM image.

This configuration further increases detectability of the marker.

The image controller may be configured to determine, in response to successful detection of the marker from the SLAM image, the display position of the subject image within a display area of the display, based on a virtual position of an object represented by the subject image in a real space and a position of the display in the real space that is obtained from the SLAM image, and to display the subject image at the determined position.

This configuration imparts the user with the illusion that the object represented by the subject image actually exists, thus allowing recognizable augmentation of the user's real environment.

The image controller may be configured to determine, in response to failure to detect the marker from the SLAM image, the display position of the subject image within a display area of the display independently of a position of the subject image in a real space, and to display the subject image at the determined position.

This configuration can provide the subject image to the user even after failure in detection of the marker.

The image display system may further include an on-vehicle display disposed within the vehicle cabin, and the image controller may be configured to display, in response to failure to detect the marker from the SLAM image, an image corresponding to the subject image on the on-vehicle display.

This configuration can provide an image having information that is equivalent to that of the subject image to the user even in to the event of a failure to detect the marker.

The marker may be disposed at a position within the field of view of the user who is sitting on a driver's seat and driving a vehicle.

This configuration enables the user to detect the marker and can provide the subject image while the user is driving.

The one or more light emitters may include two or more light emitters spaced apart from each other, and each of the two or more light emitters may emit light that serves as the marker.

A plurality of markers increase the accuracy in position detection of the display.

In accordance with another aspect of the disclosure, an image controller is configured to control driving of a display configured to be attached to the head of a user occupant of a vehicle. The display is configured to display a subject image to be superimposed on a field of vision of the user. The image controller is configured to cause one or more light emitters disposed within a vehicle cabin to emit light that serves as a marker; cause a SLAM camera fixed to the display to capture a SLAM image of surroundings of the display; and determine a display position of the subject image based on the SLAM image including the marker.

The marker created by emitted light can be detected in dark environments, such as at nighttime. This configuration enables reliable identification of the position of the display in real space, and thus enables more appropriate identification of the display position of the subject image.

The technique of the disclosure enables more appropriate determination of the display position of the subject image.

BRIEF DESCRIPTION OF DRAWINGS

Embodiments of the present disclosure will be described based on the following figures, wherein.

DESCRIPTION OF EMBODIMENTS

Figure 1:
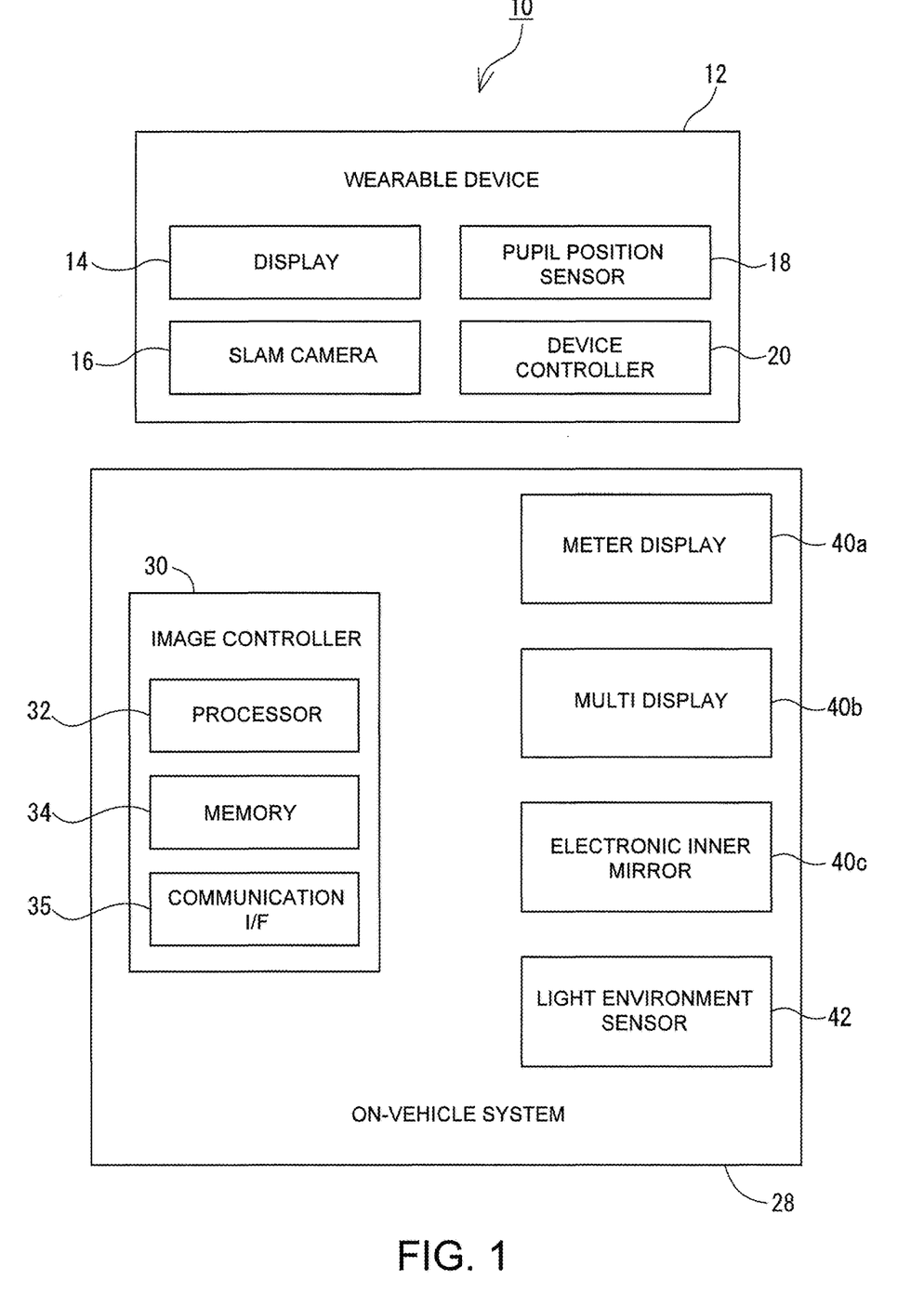
FIG. 1 is a block diagram illustrating a configuration of an image display system.

The configuration of an image display system 10 will be described by reference to the drawings. While in the following specific embodiments are described for the ease of understanding, these are only examples and may be modified as appropriate. FIG. 1 is a block diagram illustrating the configuration of the image display system 10. The image display system 10 includes a wearable device 12 and an on-vehicle system 28.

The wearable device 12 is a device an occupant of the vehicle, such as a driver, wears on their head and may be an eyeglass or goggle shaped device. The wearable device 12 includes a display 14, a SLAM camera 16, a pupil position sensor 18, and a device controller 20.

Figure 2:
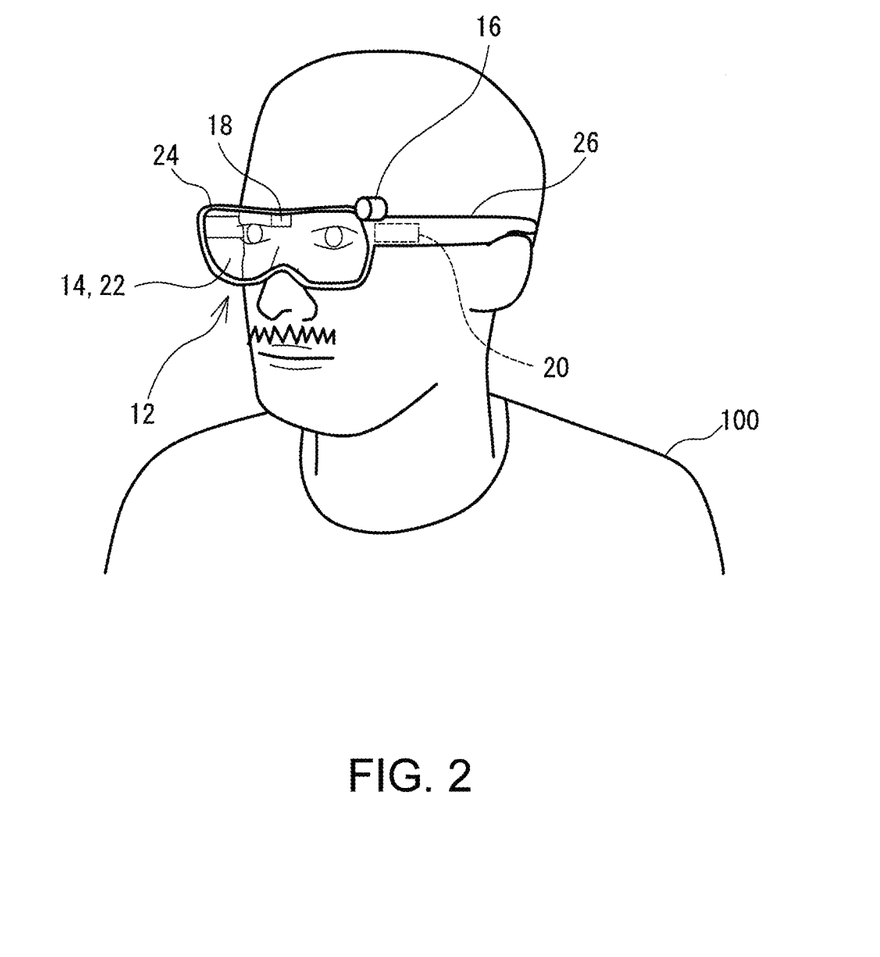
FIG. 2 illustrates a user wearing a wearable device.

The wearable device 12 will be described in detail with reference to FIG. 2. FIG. 2 illustrates a user 100 occupant of the vehicle wearing the wearable device 12. The wearable device 12 is in the form of eyeglasses and is referred to as smart glasses or AR glasses. The wearable device 12 includes temples 26 that are linear frames to be put over respective ears and a rim 24 that is a frame surrounding the eyes and that is to be put across the nose.

The display 14 displays an image on the field of vision of the user 100 wearing the wearable device 12. In this example, the display 14 is an organic EL display or a liquid crystal display having a display area 22 disposed within the rim 24, and displays an image in part of or over the entire region of the display area 22. The display area 22 having high transparency allows the user 100 or the occupant to visually recognize scenery in front through the display area 22 with no image being displayed on the display area 22. The display area 22, when displaying an image in only part of the display area 22, allows the user 100 to see both the forward scenery in the field of view and the displayed image simultaneously. This image may at this time be opaque or translucent. In the following description, an image displayed on the display 14 is referred to as a "subject image" for discrimination from other images. Also, an object which is virtually represented by the subject image is referred to as a "subject".

The SLAM camera 16 is fixed to the display 14 to image the surroundings of the display 14. The SLAM camera 16 is secured, for example, to the vicinity of a front end of the temple 26 so as to face forward, and captures an image within a range similar to that of the field of vision of the user 100. In the following description, an image captured by the SLAM camera 16 will be referred to as a "SLAM image". An image controller 30, which will be described below, specifies the position and attitude of the display 14 in real space based on an AR marker in the SLAM image, as will be described below.

The pupil position sensor 18 detects the positions of pupils in the right and left eyes of the user 100, and is fixed to the vicinity of the center of the rim 24, for example. The pupil position sensor 18 may be formed of a camera, for example.

The device controller 20 controls operation of the wearable device 12 in response to an instruction from the image controller 30. The device controller 20 may be a computer having a processor and a memory, for example. The device controller 20 continuously transmits the images captured by the SLAM camera 16 and the pupil position sensor 18 to the image controller 30 and displays the subject image on the display 14 in accordance with an instruction from the image controller 30.

Referring again to FIG. 1, the on-vehicle system 28 will be described. The on-vehicle system 28 is installed in a vehicle, and includes the image controller 30, a meter display 40*a*, a multi display 40*b*, an electronic inner mirror 40*c*, and a light environment sensor 42. The meter display 40*a*, the multi display 40*b*, and the electronic inner mirror 40*c* are installed in a vehicle and can be visually recognized by the driver during driving. In the following description, these displays will be referred to as "on-vehicle displays 40" unless discrimination among these displays is necessary. The on-vehicle displays 40 function as light emitters that emit light forming the AR marker, as will be described below.

Figure 3:
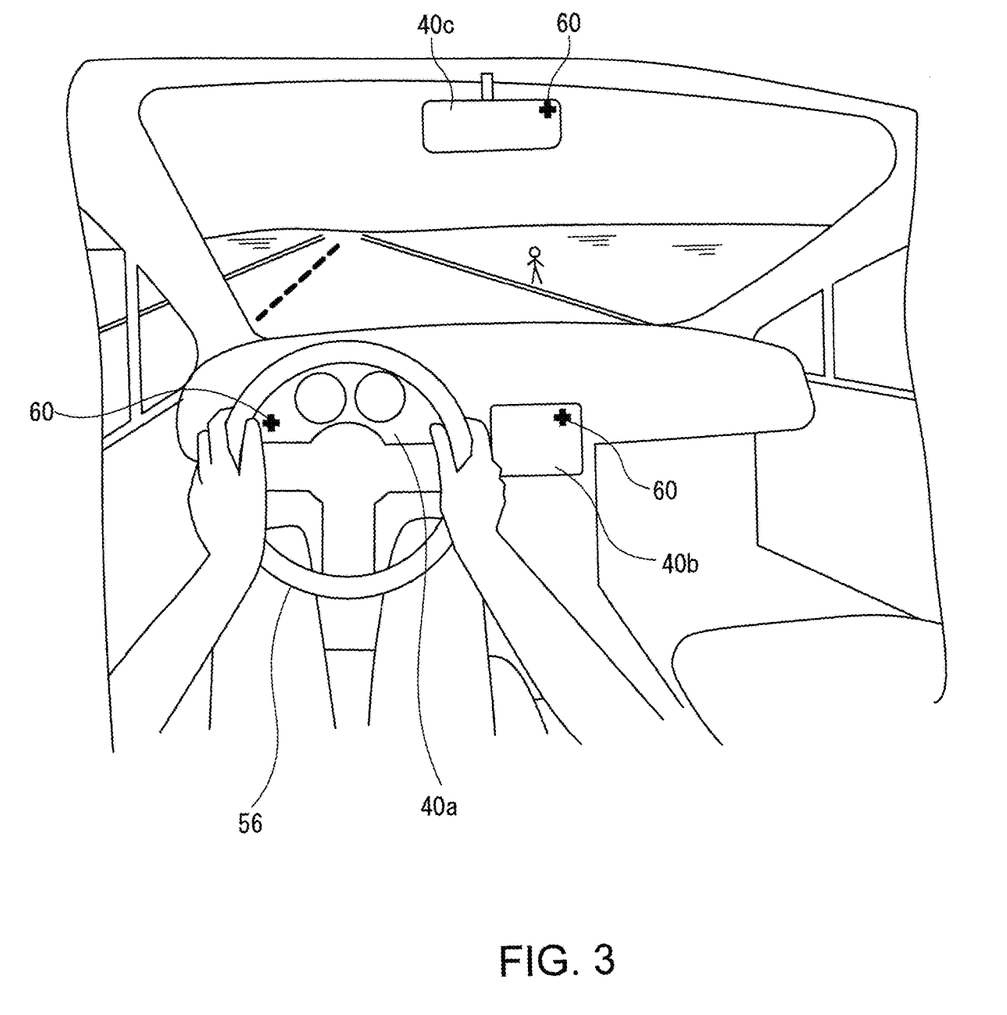
FIG. 3 schematically illustrates a field of view of a driver or a user.

The arrangement of the on-vehicle displays 40 will be described by reference to FIG. 3. FIG. 3 schematically illustrates the field of view of the driver or the user 100. The meter display 40*a* indicates information regarding the state of the vehicle, such as the speed and mileage. As illustrated in FIG. 3, the meter display 40*a* is disposed on the opposite side of the steering wheel 56 from the driver, which enables the driver to visually recognize the display area of the meter display 40*a* through the steering wheel 56.

The multi display 40*b* indicates information regarding on-vehicle electronic instruments, such as a navigation device or an audio device. As illustrated in FIG. 3, the multi display 40*b* is disposed at the center of the instrument panel in the vehicle width direction, that is, on what is commonly called a center console.

The electronic inner mirror 40*c* displays an image from the rear of the vehicle as imaged by a rearview camera (not shown). The electronic inner mirror 40*c* is used in place of a rearview mirror which shows the rear of the vehicle by optical reflection. The electronic inner mirror 40*c* may be switchable between a digital mode showing an image and a mirror mode for showing the rear by optical reflection. As illustrated in FIG. 3, the electronic inner mirror 40*c* is disposed at a position where a rearview mirror is typically disposed, that is, in the vicinity of the upper end of the windshield glass.

Referring again to FIG. 1, the light environment sensor 42 detects an environmental light condition around the on-vehicle displays 40. An environmental light condition refers to conditions including at least one of luminance or color temperature of light. The light environment sensor 42 may include at least one of an illuminance sensor that detects lightness of light or a color temperature sensor that detects color of light. A single light environment sensor 42 or two or more light environment sensors 42 may be disposed. For example, the light environment sensor 42 may be disposed on the wearable device 12. In another embodiment, the light environment sensors 42 may be disposed near the respective on-vehicle displays 40. The light environment sensor 42 may be disposed specifically for the image display system 10, or an existing sensor installed in a vehicle may be used for the light environment sensor 42. For example, some vehicles include an auto-lighting function to automatically turn on lights such as a headlight in response to darkness around the vehicle, and an illuminance sensor that is an auto-lighting sensor disposed for such an auto-lighting function may be used as the light environment sensor 42. Further, some multi displays 40*b* contain an illuminance sensor to automatically adjust the emission brightness in accordance with the peripheral lightness, and such an illuminance sensor included in the multi displays 40*b* may be used as the light environment sensor 42.

The image controller 30 generates data of a subject image to be displayed on the display 14. The image controller 30 is physically a computer including a processor 32, a memory 34, and a communication I/F 35. The computer includes a microcontroller composed of a computer system integrated into a single integrated circuit. The processor 32 refers to a processor in a broad sense, and includes a general-purpose processor, such as a Central Processing Unit (CPU), and a special-purpose processor, such as a Graphics Processing Unit (GPU), an Application Specific Integrated Circuit (ASIC), a Field Programmable Gate Array (FPGA), or a programmable logic device.

The memory 34 refers to a device that stores digital data to be processed by a computer. The memory 34 includes at least one of a main memory connected with the processor 32 via a memory bus and a secondary memory device that accesses the processor 32 via an input/output channel. The memory 34 may include at least one of a semiconductor memory, such as RAM, ROM, or solid state drive, for example, or a magnetic disk, such as a hard disk drive.

The communication I/F 35 transmits and receives data, through wire or wirelessly, to and from other electronic devices or specifically the wearable device 12, the on-vehicle displays 40, and the light environment sensor 42. For example, the communication I/F 35 may transmit and receive data to and from the on-vehicle displays 40 and the light environment sensor 42 through Controller Area Network (CAN) communication. The communication I/F 35 may further transmit and receive data to and from the wearable device 12 through short-distance wireless communication such as Bluetooth (registered mark), Wi-Fi (registered mark), or infrared communication.

The image controller 30 may include a plurality of computers mechanically spaced from each other, rather than being a single computer. The processing of the image controller 30 which will be described below may be partially implemented by a computer installed in the wearable device 12 or the on-vehicle displays 40. While in the present embodiment, the image controller 30 is mounted in the vehicle, the image controller 30 may be incorporated in the wearable device 12 or in a mobile computer, such as a smartphone, which is separate from the wearable device 12.

The image controller 30 generates data of the subject image to be displayed on the display 14, as described above. The display 14 displays the subject image either in a "space-fixed display" mode or a "device-fixed display" mode. These two display modes will be described with reference to FIG. 4.

Figure 4:
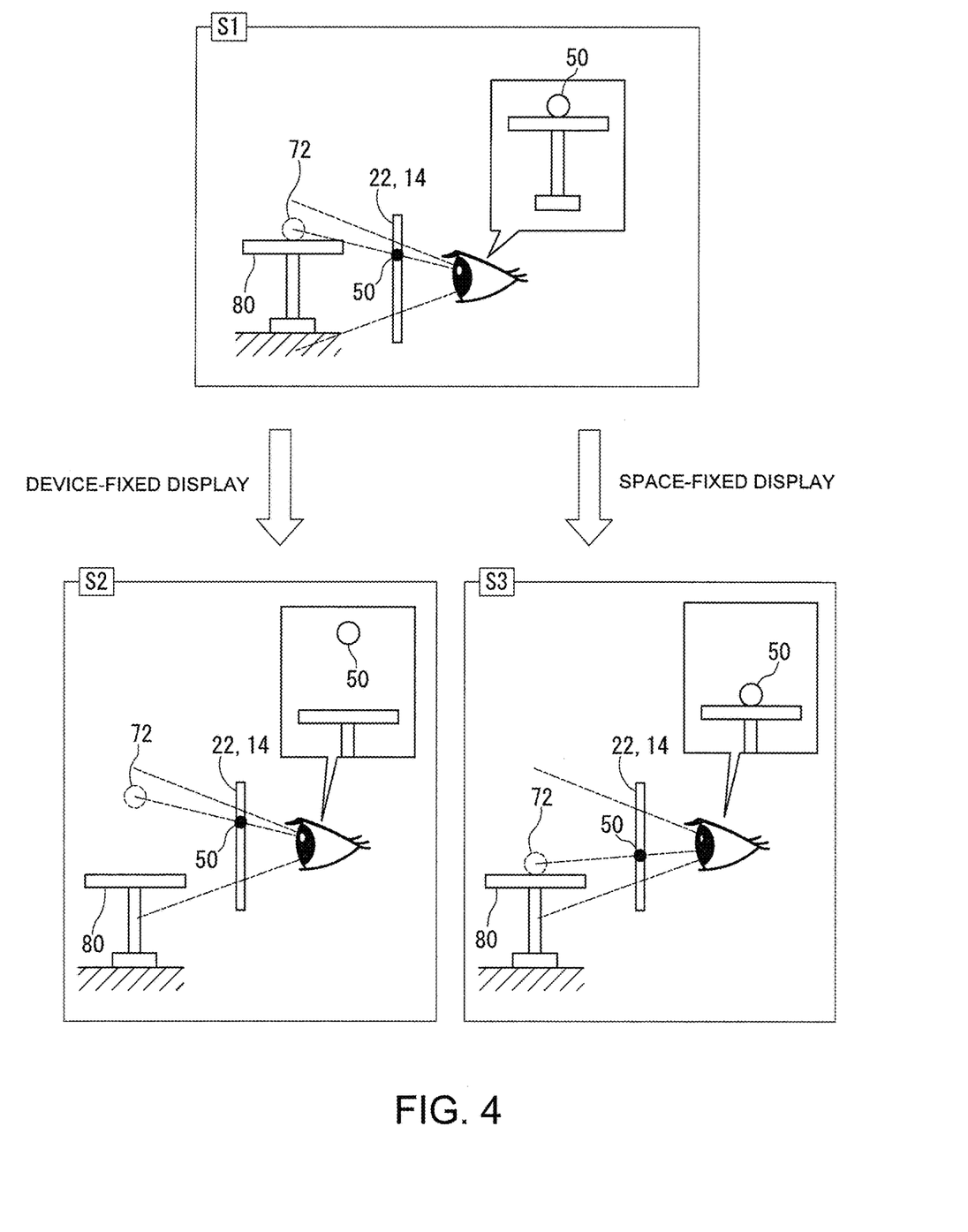
FIG. 4 is an image view for explaining a space-fixed display mode and device-fixed display mode.

In the space-fixed display mode, a subject image that represents a predetermined object is displayed as if the object exists in real space. In the device-fixed display mode, a subject image that represents a predetermined object is displayed at a specific position in the display area 22 irrespective of the position of the object in real space.

Assuming, for example, that the user 100 is viewing a real space that actually includes a table 80 through the display area 22 of the display 14, as illustrated in FIG. 4. In this case, displaying a subject image 50 that represents a "ball" in the display area 22 would naturally result in the field of vision of the user 100 simultaneously showing the real space including the table 80 and the subject image 50 of the "ball", as indicated in a state S1 in FIG. 4.

In the device-fixed display mode, the display position of a subject 72 indicated by the subject image 50, which is a "ball" in the example of FIG. 4, is determined independently of its position in the real space. Therefore, in the device-fixed display mode, moving the eyepoint of the user 100 would not require changes in the display position, size, and shape of the subject image 50 within the display area 22 as indicted in a state S2 in FIG. 4.

In the space-fixed display mode, the place in the real space where the subject 72 indicated by the subject image 50, which is a "ball" in the example of FIG. 4, is located is specified, and the subject image 50 is displayed as if the subject 72 is actually present at the specified position. For example, assuming that, in the space-fixed display mode, the subject 72 or a "ball" is located on the table 80 in the real space. In this case, the display position, size, and shape of the "ball" within the display area 22 are changed such that the user 100 can view the "ball" on the table 80 even if the eyepoint of the user 100 moves as indicated in a state S3.

As described above, displaying the subject image 50 in the space-fixed display mode gives the user 100 the illusion that the subject 72 represented by the subject image 50 is actually present. In other words, displaying the subject image 50 in the space-fixed display mode would enable addition, deletion, emphasis, and attenuation of information with respect to the real-world environment, thereby augmenting the real world viewed by humans. This technique is typically referred to as "augmented reality" or "AR".

Figure 5:
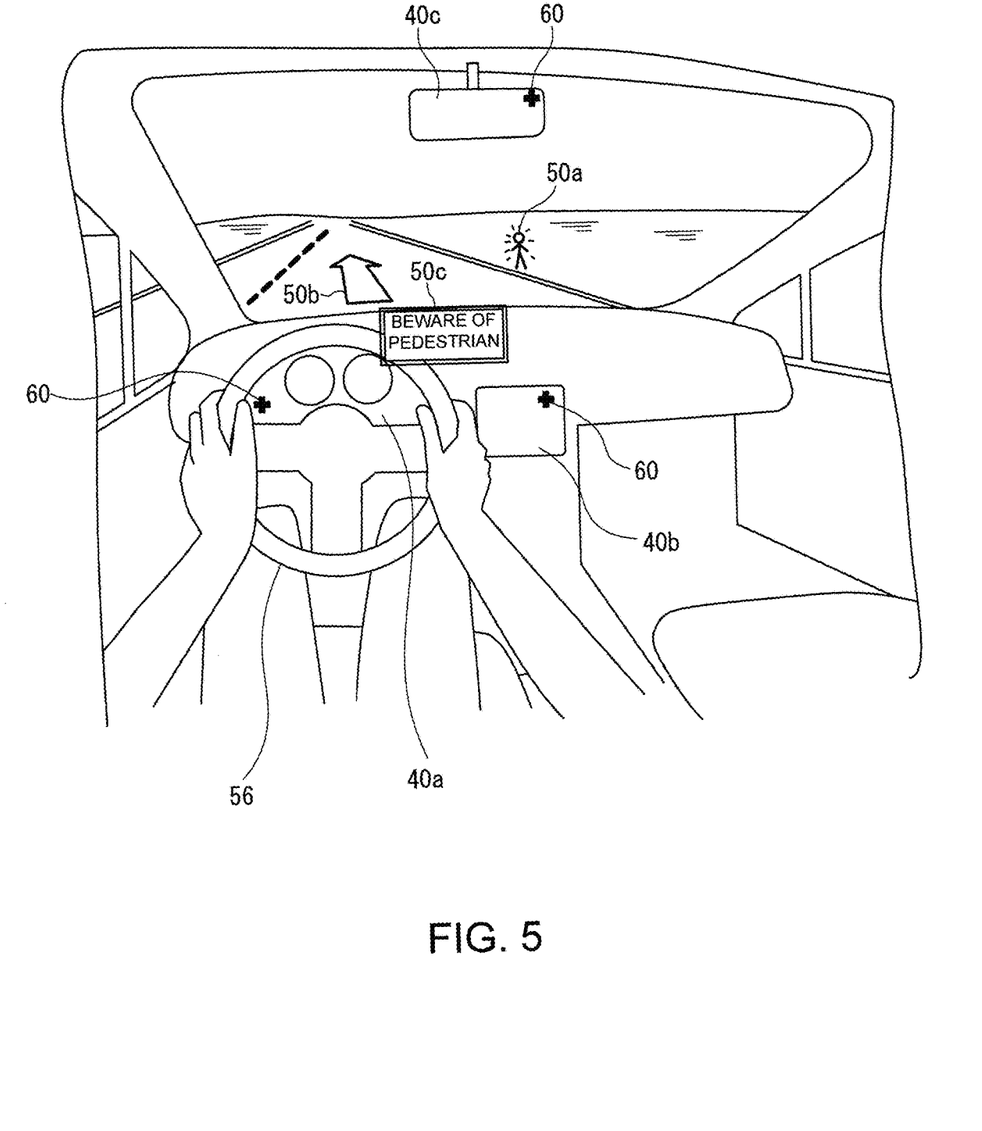
FIG. 5 schematically illustrates a field of view of a user with a subject image being displayed.

An example display of the subject image 50 in the present embodiment will be now described. FIG. 5 schematically illustrates the field of vision of the user 100 (or a driver in this example) with subject images 50a, 50b, and 50c being displayed. In the example illustrated in FIG. 5, the subject image 50a for emphasizing a pedestrian, the subject image 50b indicating the travelling direction of the vehicle, and the subject image 50c indicating message that attracts driver's attention, are displayed in the space-fixed display mode. These subject images 50a, 50b, and 50c are displayed on the display 14 at positions and in sizes that are similar to the positions and sizes of the subjects represented by the respective images existing in the real world. The subject image 50a, for example, is displayed in the display area 22 at the position and in the size of an object moving with the pedestrian assuming that the object actually exists in the real world. Therefore, the position and the size of the subject image 50a within the display area 22 changes with the change of the relative positional relationship between the pedestrian and the user 100. The subject image 50a may also change its shape in accordance with the position or posture of the pedestrian in the real world.

The subject image 50b is displayed in the display area 22 at the position and in the size similar to those of an arrow-shape object represented by the subject image 50b assuming that the object actually resides on the road surface in front of the vehicle that actually exists. The subject image 50c is displayed in the display area 22 at a position and in a size similar to those of a text box represented by the subject image 50c assuming that the object actually resides on the upper right portion of the steering wheel 56 in the real world. Thus, the display positions and the sizes of the subject images 50b and 50c within the display area 22 change with the movement of the eyepoint of the user 100.

As described above, the space-fixed display mode enables display of the subject image 50 in consideration of locations of actual objects, thereby reliably preventing the subject image 50 from obstructing the driving operation. The space-fixed display mode further enables the subject image 50 to be displayed at a position correlated with that of the actual object, such as a pedestrian, thus effectively directing attention of the user 100 toward the object.

To achieve the space-fixed display, it is necessary to accurately detect the position of the pupils with respect to the display 14, and the position and attitude of the display 14 in the real space. Based on the position and attitude of the subject in the real space, the position and attitude of the display 14 in the real space, and the positions of the pupils in the display 14, the image controller 30 determines the position of, for example, the subject image 50 within the display area 22. As described above, the positions of the pupils with respect to the display 14 are detected by the pupil position sensor 18.

The position and attitude of the display 14 in the real space is calculated by the image controller 30 performing Visual Simultaneous Localization and Mapping (visual SLAM) based on a SLAM image captured by the SLAM camera 16. Visual SLAM refers to a technique for estimating three-dimensional information of the environment and the position and attitude of the camera simultaneously based on images captured by the camera. To facilitate performing of visual SLAM, an AR marker 60 (see FIG. 3) is disposed within the vehicle. To calculate the position and attitude of the display 14 in the real space based on the coordinates, size, and distortion, for example, of the image of the AR marker 60 within the SLAM image, the image controller 30 extracts an image of the AR marker 60 from the SLAM image captured by the SLAM camera 16.

While an actual object has been used for such an AR marker 60, in some cases, the image controller 30 is unable to detect an actual object because of the environmental light conditions within the vehicle. For example, in a dark environment such as during nighttime, an area around the AR marker 60 may be clipped in the SLAM image and may appear as a black area. In contrast, the AR marker 60 in strong sunlight may appear as a white area when shown in the SLAM image, which is referred to as blown-out highlights. In the case of such clipping, the image controller 30 is unable to detect the AR marker 60 or the position and attitude of the display 14 in the real space, failing to perform space-fixed display of the subject image 50.

In this embodiment, the AR marker 60 for use in visual SLAM is composed of light emitted from the on-vehicle displays 40 (or light emitters). Specifically, in this embodiment, the on-vehicle displays 40 are caused to display an image that functions as the AR marker 60. In the example illustrated in FIG. 3, cross-shape images displayed on the meter display 40a, the multi display 40b, and the electronic inner mirror 40c, respectively, function as the AR marker 60 for use in visual SLAM.

Figure 6:
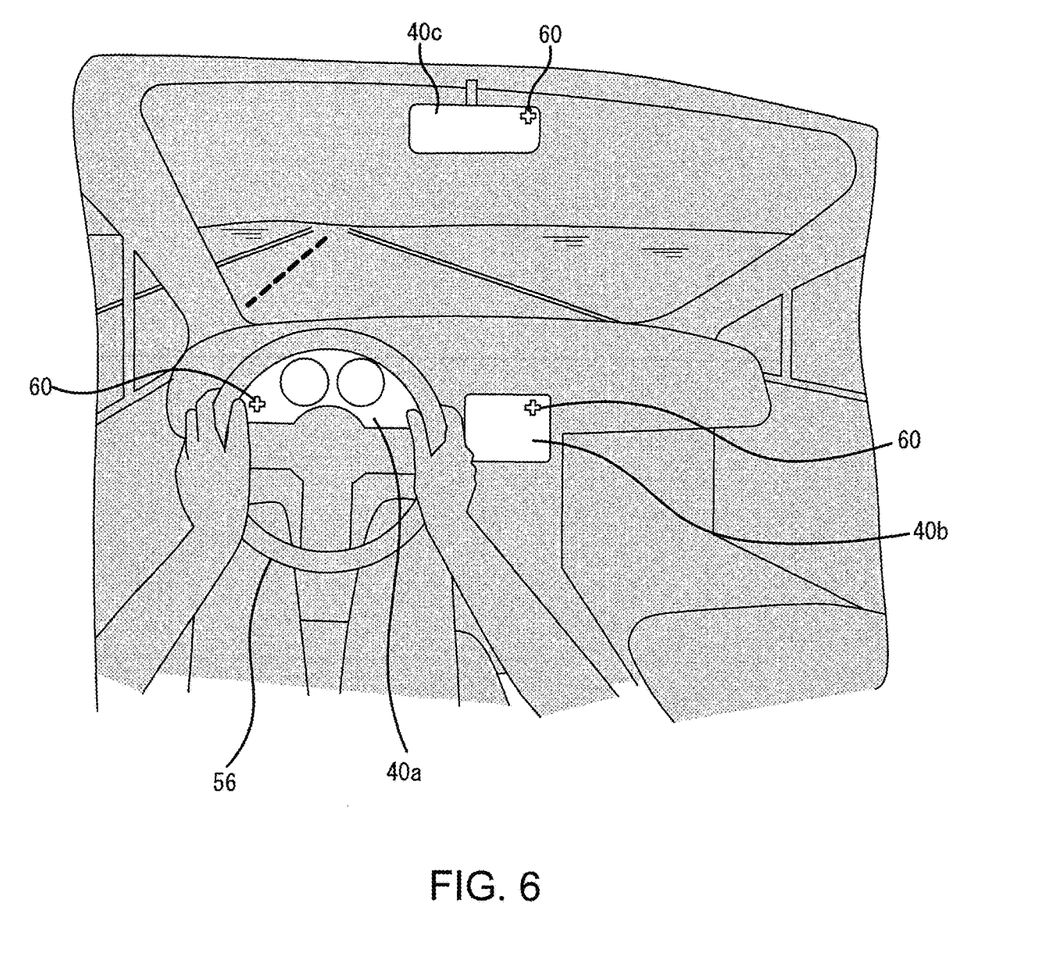
FIG. 6 schematically illustrates a field of view of a driver during night time.

The AR markers 60 formed of light emitted from the on-vehicle displays 40 as described above appropriately appear in the SLAM image in a dark environment such as at nighttime, as illustrated in FIG. 6. This enables the image controller 30 to perform visual SLAM properly based on the SLAM image, and to thereby display the subject image 50 appropriately.

The image controller 30 is able to obtain the shape and display position of the AR marker 60, which may be fixed or change as appropriate, at a required timing. For example, the display position and shape of the AR marker 60 may be predetermined and fixed. In this configuration, the image controller 30 prestores the determined display position and shape of the AR marker 60. In another embodiment, the display position and shape of the AR marker 60 may be changed as appropriate. For example, the AR marker 60 may be displayed on the upper right corner of the multi display 40b which is showing map information and may be displayed on the lower right corner of the multi display 40b which is showing audio information. Further, the shape of the AR marker 60 may be changed between these two cases. In this configuration, one of the image controller 30 or the on-vehicle display 40 determines the display position and shape of the AR marker 60, and transmits the determined information to the other through data communication.

Figure 7:
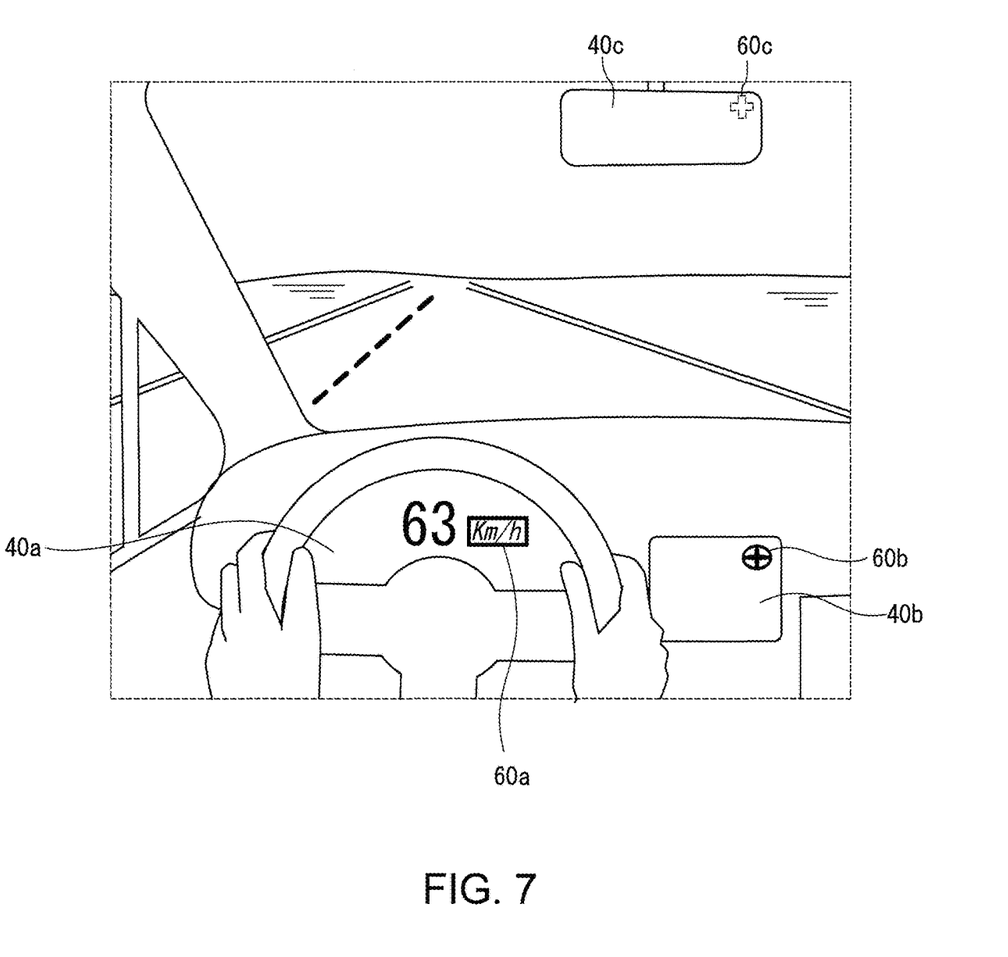
FIG. 7 illustrates another example AR marker.

The AR markers 60 displayed on the different on-vehicle displays 40 may have an identical shape or different shapes. Specifically, as illustrated in FIG. 7, the three on-vehicle displays 40a, 40b, and 40c may respectively display the AR markers 60a, 60b, and 60c having different shapes. The AR marker 60 may be provided specifically for use in visual SLAM, or an existing image may be used for the AR marker 60. For example, the meter display 40a displays an image representing the speed unit, which is Km/h, in the example illustrated in FIG. 7, irrespective of execution of visual SLAM, and this image may be used as the AR marker 60a. Not just visible light but also invisible light, which can be detected by the SLAM camera 16, may form the AR marker 60. For example, an image of the AR marker 60 may be formed based on infrared light.

Figure 8:
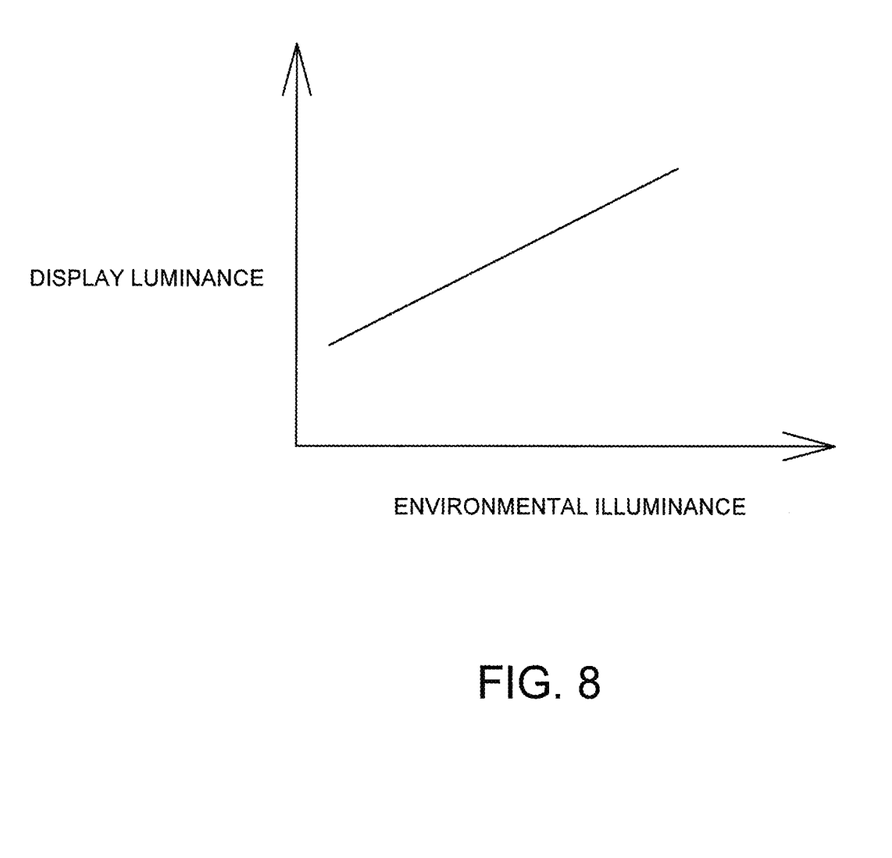
FIG. 8 illustrates an example brightness profile.

The image controller 30 may determine the marker display condition including at least one of luminance, color, or brightness in accordance with the environmental light conditions in the vicinity of the on-vehicle display 40 and instruct the on-vehicle display 40 to display the AR marker 60 under the determined marker display condition. For example, the image controller 30 may change the display luminance of the AR marker 60 in accordance with the illuminance in the vicinity of the on-vehicle display 40 (hereinafter referred to as "environmental illuminance"). In this configuration, the image controller 30 may prestore the luminance profile as illustrated in FIG. 8 and determine the display luminance of the AR marker 60 based on this luminance profile. In the luminance profile illustrated in FIG. 8, the horizontal axis indicates the environmental illuminance and the vertical axis indicates the display luminance of the AR marker 60. In the example illustrated in FIG. 8, the higher the environmental illuminance, the higher the display luminance of the AR marker 60. This configuration allows the AR marker 60 to be clearly displayed under the environment with high environmental illuminance. Meanwhile, in the environment with low environmental illuminance, it is possible to prevent the AR marker 60 from being excessively bright, avoiding the user 100 from being dazzled.

In another embodiment, the image controller 30 may change at least one of color or brightness of the AR marker 60 in accordance with the color temperature in the vicinity of the on-vehicle display 40 (hereinafter referred to as "environmental color temperature"). For example, when the environmental color temperature is a color temperature with sunset-like strong red, the AR marker 60 may be changed to a color closer to blue.

The environmental light conditions in the vicinity of the on-vehicle display 40 may also be specified based on the detection result of the light environment sensor 42. In another embodiment, the image controller 30 may estimate the environmental light conditions in the vicinity of the on-vehicle display 40 based on the date and time or the illuminating state of vehicle lights. For example, the image controller 30 may calculate the solar altitude based on the date and time and estimate the environmental light conditions in the vicinity of the on-vehicle display 40, such as illuminance, based on the altitude. The image controller 30 may further modify the environmental light conditions estimated from the date and time, based on at least one of the weather, the vehicle position, or the vehicle orientation. For example, the image controller 30 may estimate the intensity of the sunlight based on the weather and modify the environmental light conditions estimated from the date and time, based on the estimation result. The image controller 30 may further estimate the degree of sunlight shielding, such as whether the vehicle is located indoors, based on the vehicle position, and modify the environmental light conditions estimated from the date and time based on the estimation result. The image controller 30 may also estimate whether the vehicle cabin is illuminated by direct sunlight based on the solar altitude and the vehicle orientation, and modify the environmental light conditions estimated from the date and time based on the estimation result. In another embodiment, the image controller 30 may estimate the environmental light conditions in the vicinity of the on-vehicle display 40 based on the illuminating state of lights that are obliged to be turned on in the nighttime, such as headlights.

In another embodiment, the image controller 30 may estimate the environmental light conditions in the vicinity of the on-vehicle display 40 based on the SLAM image captured by the SLAM camera 16. As the wearable device 12 is attached to the head of the vehicle occupant, the SLAM image can be assumed to be an image of the vehicle interior. It is highly likely that the luminance and color of the entire SLAM image reflects the environmental light conditions of the vehicle interior, and thus, in the vicinity of the on-vehicle display 40. The image controller 30 may therefore estimate the environmental light conditions in the vicinity of the on-vehicle display 40 based on the trend of luminance and color of the entire SLAM image.

While in the above description, the display condition of the AR marker 60 is changed based on the environmental light conditions in the vicinity of the on-vehicle display 40, the image controller 30 may change the display condition of the AR marker 60 based on the SLAM image captured by the SLAM camera 16. For example, it is highly likely that failure to extract the AR marker 60 from the SLAM image occurs from shortage of display luminance of the AR marker 60. Therefore, when it is not possible to extract the AR marker 60 from the SLAM image, the image controller 30 may instruct the on-vehicle display 40 to increase the display luminance of the AR marker 60. Further, in response to failure to extract the AR marker 60 from the SLAM image, the image controller 30 may instruct the on-vehicle display 40 to gradually change the display luminance and the color of the AR marker 60 in one direction and specify the display luminance, for example, upon proper detection of the AR marker 60, as the display condition of the AR marker 60. When the AR marker 60 extracted from the SLAM image include an edge that is not sufficiently clear, the image controller 30 may instruct the on-vehicle display 40 to change the display condition of the AR marker 60 so as to display the edge clearly.

As described above, in the present embodiment, the image displayed on the on-vehicle display 40 is used as the AR marker 60. This configuration enables the image controller 30 to detect the AR marker 60 more reliably to thereby execute visual SLAM more properly and thus display the subject image 50 more properly. Under certain environmental light conditions within the vehicle, the image controller 30 fails to detect the AR marker 60 even after the luminance, for example, of the AR marker 60 has been changed. In this case, the image controller 30 may display the subject image 50 in the device-fixed display mode, rather than the space-fixed display mode. In another embodiment, in response to failure to detect the AR marker 60, the image controller 30 may display an image corresponding to the subject image 50 on the on-vehicle display 40.

Figure 9:
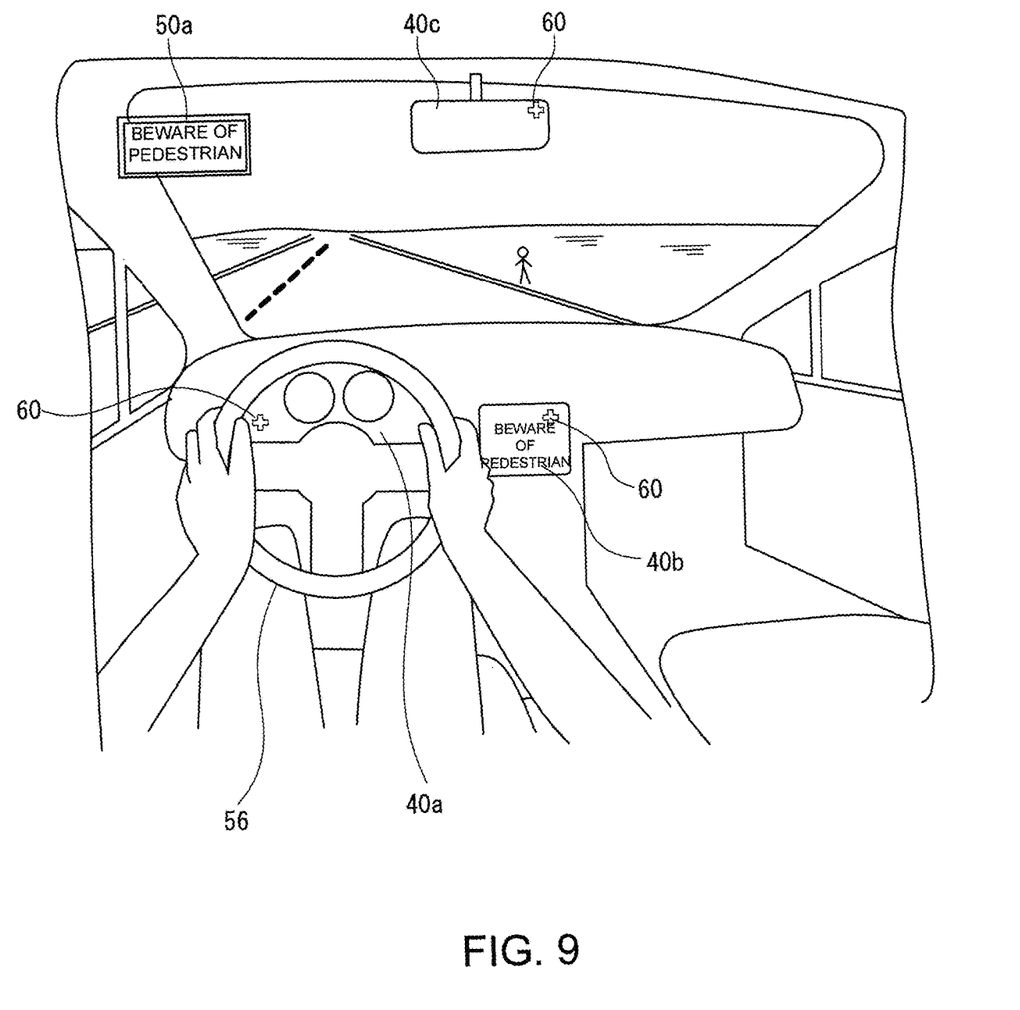
FIG. 9 illustrates example image display in response to failure to detect an AR marker.

Assuming, for example, a case wherein it is attempted to display a subject image 50a to direct the attention to a pedestrian, but the AR marker 60 cannot be detected, the image controller 30 may display, on the multi display 40b, an image that promotes attention to the pedestrian, as illustrated in FIG. 9. The image controller 30 may further display, on a specific location in the display area 22, an image that promotes attention to the pedestrian (the subject image 50a in FIG. 9). In displaying the subject image 50a in the device-fixed display mode, consideration should be made to prevent the image 50a from obstructing the driving operation. For example, as humans tend to acquire various information necessary for driving operation from the center of their field of vision, there is significant risk that an image displayed in the center of the field of vision may obstruct the driving operation. Therefore, in displaying the subject image 50a in the device-fixed display mode, the image 50a may be displayed at a corner of the display area 22. Further, in displaying the subject image 50a in the device-fixed display mode, the image 50a may be translucent so as to allow the driver to visually recognize the surroundings through the image 50a.

Figure 10:
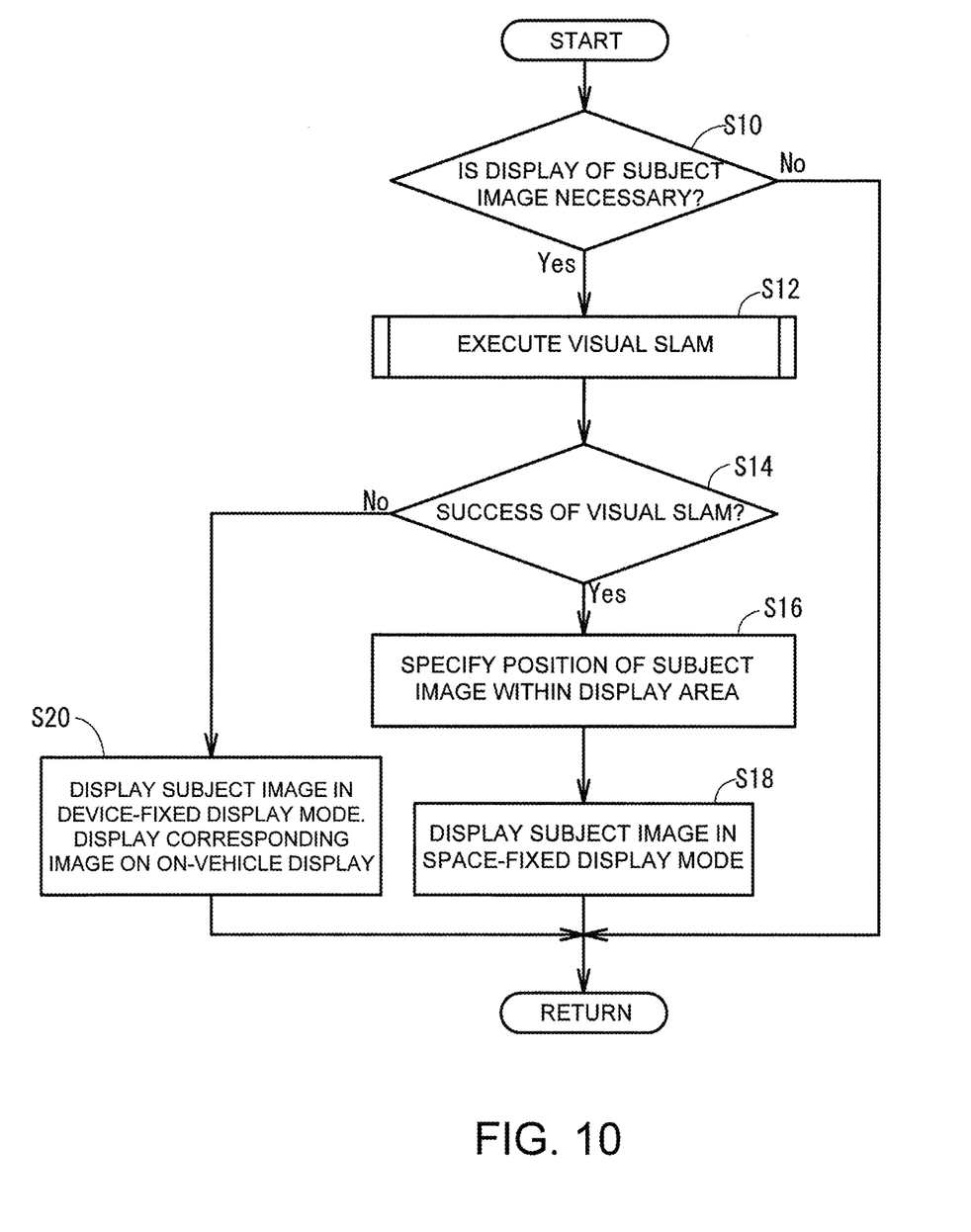
FIG. 10 is a flowchart illustrating a flow of image display processing in the image display system.

Referring now to FIG. 10, the flow of image displaying processing in the image display system 10 will be described. In response to a determination that display of the subject image 50 is necessary (Yes in step S10), the image controller 30 performs visual SLAM processing to specify the position and attitude of the display 14 in the real space (S12). The visual SLAM processing will be described in detail below.

In response to success of the visual SLAM processing (Yes in step S14), the image controller 30, based on the specified position and attitude of the display 14 in the real space, specifies the display position, for example, of the subject image 50 in the display area 22 (step S16) and displays the subject image 50 on the display 14 in the space-fixed display mode (step S18). Thereafter, the process returns to step S10, and similar processing is repeated.

In response to failure of the visual SLAM processing (No in step S14), the image controller 30 displays an image corresponding to the subject image 50 on the display 14 in the device-fixed display mode or displays the image on the on-vehicle display 40 (S20). Thereafter, the process returns to step S10 to repeat similar processing.

Figure 11:
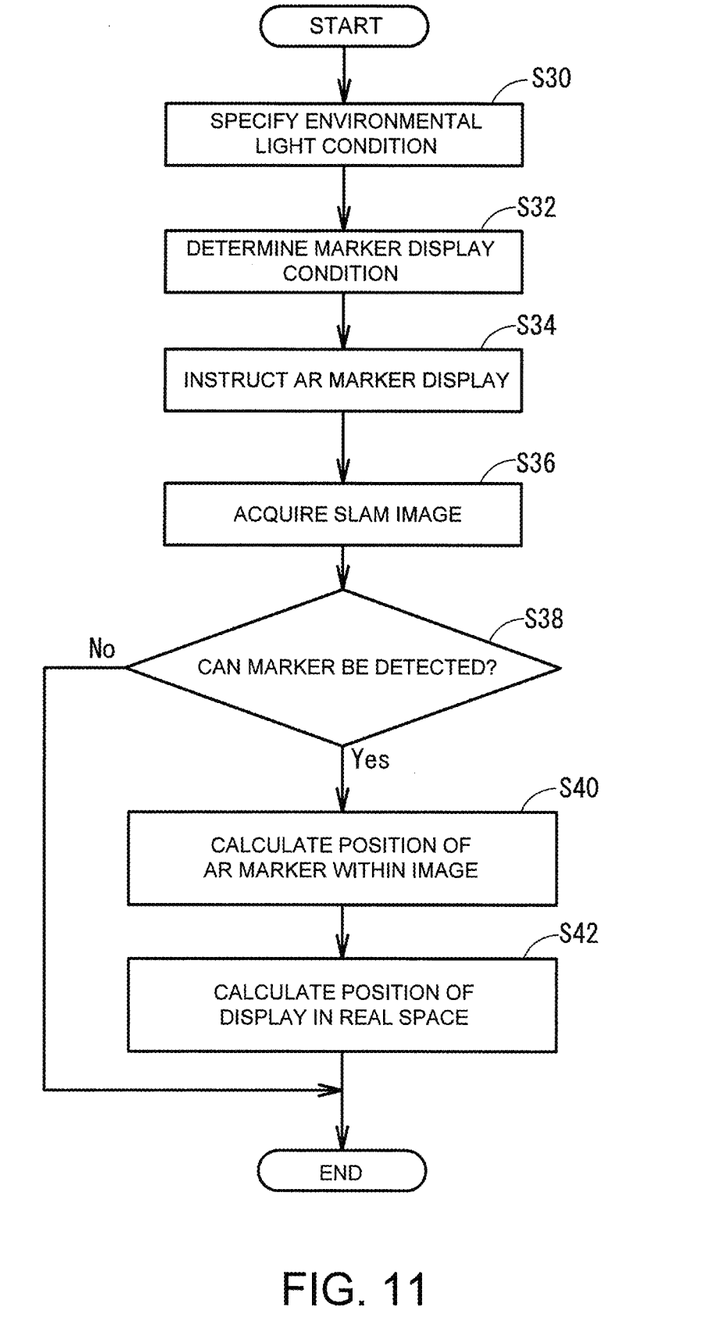
FIG. 11 is a flowchart illustrating a flow of visual SLAM processing.

Referring now to FIG. 11, the flow of the visual SLAM processing will be described. To perform the visual SLAM processing, the image controller 30 specifies the environmental light conditions in the vicinity of the on-vehicle display 40 (S30). The environmental lighting condition may be specified based on the detection result of the light environment sensor 42 or based on the date and time, the illuminating state of lights, and the SLAM image, for example.

After the environmental light condition is specified, the image controller 30, based on the environmental light conditions, determines the display condition, such as display luminance or color, of the AR marker 60 (step S32), and instructs the on-vehicle display 40 to display the AR marker 60 under the determined display condition (step S34). In response to this instruction, the on-vehicle display 40 displays the AR marker 60.

Subsequently, the image controller 30 acquires the SLAM image captured by the SLAM camera 16 (step S36). The image controller 30 further determines whether the AR marker 60 can be detected from the SLAM image (step S38). In response to the determination that the AR marker 60 can be detected (Yes in step S38), the image controller 30 specifies the position, size, and distortion, for example, of the AR marker 60 within the SLAM image (step S40), and further calculates, based on the specified information of the AR marker 60, the position and attitude of the display 14 in the real space (step S42).

In response to the determination that the AR marker 60 cannot be detected from the SLAM image in step S38 (No in step S38), the image controller 30 proceeds to step S20 (see FIG. 10) without calculating the position or attitude of the display 14.

As is clear from the above description, in the present embodiment, the AR marker 60 that is necessary for visual SLAM is formed of light emitted from the light emitter, which is specifically the on-vehicle display 40. This configuration enables detection of the AR marker 60 and thus appropriate performing of visual SLAM under the dark environment such as in the nighttime. Further, in the present embodiment, to enable proper detection of the AR marker 60, the display condition of the AR marker 60 is changed based on the environmental light conditions in the vicinity of the on-vehicle display 40 or the SLAM image that is captured. This configuration enables more reliable detection of the AR marker 60 and thus proper performing of visual SLAM with the change of the environmental light conditions in the vicinity of the on-vehicle display 40.

The above description describes only examples, and, while the image display system should at a minimum be configured to use an image formed of light emitted from a light emitter as the AR marker 60, the configuration of other elements may be modified. For example, in the above description, the on-vehicle display 40 that displays an image is used as the light emitter, other devices, such as an indicator lamp and illumination devices disposed within the vehicle cabin to emit light of a predetermined mode, may be used as the light emitter.

Further, while in the above description, the display 14 shows an image on the display area 22, the display 14 may be a projector that projects an image onto the retina of the user 100. Further, while in the above description, the user 100 visually recognizes the real space through the transparent display area 22, the display area 22 may be configured to be opaque to prevent the user 100 from visually recognizing the real space through the display area 22. In this configuration, the image controller 30 displays, on the display area 22, a synthesis image including an image of the real space and a subject image representing a virtual object.

REFERENCE SIGNS LIST

10 image display system, 12 wearable device, 14 display, 16 SLAM camera, 18 pupil position sensor, 20 device controller, 22 display area, 24 rim, 26 temple, 28 on-vehicle system, 30 image controller, 32 processor, 34 memory, 35 communication I/F, 40 on-vehicle display, 40*a* meter display, 40*b* multi display, 40*c* electronic inner mirror, 42 light environment sensor, 50 subject image, 56 steering wheel, 60 AR marker, 72 subject, 80 table, 100 user.

The invention claimed is:

1. An image display system, comprising:
a display configured to be attached to the head of a user that is an occupant of a vehicle, the display configured to display a subject image to be superimposed on a field of vision of the user;
a simultaneous localization and mapping (SLAM) camera fixed to the display to capture a SLAM image of surroundings of the display;
one or more light emitters disposed within a vehicle cabin, the one or more light emitters configured to emit light that serves as a marker; and
an image controller configured to determine a display position of the subject image based on the SLAM image including the marker,
wherein
the marker has a marker display condition including at least one of a luminance, a color, or a brightness, the marker display condition being variable, and
the marker display condition is changed in accordance with an environmental light condition in the vicinity of the one or more light emitters.

2. The image display system according to claim 1, wherein
the one or more light emitters include an on-vehicle display disposed within the vehicle cabin to display an image, and
the marker is an image displayed in a display area of the on-vehicle display.

3. The image display system according to claim 1, further comprising:
a light environment sensor configured to detect the environmental light condition in the vicinity of the one or more light emitters,
wherein
the image controller is configured to specify the environmental light condition in the vicinity of the one or more light emitters based on a detection result of the light environment sensor.

4. The image display system according to claim 1, wherein
the image controller is configured to specify the environmental light condition in the vicinity of the one or more light emitters based on at least one of a date and time, an illuminating state of a light of the vehicle, or the SLAM image.

5. The image display system according to claim 1, wherein
the image controller is configured to change the marker display condition in accordance with the SLAM image.

6. The image display system according to claim 1, wherein
in response to success in detection of the marker from the SLAM image, the image controller is configured
to determine the display position of the subject image within a display area of the display, based on a virtual position of an object represented by the subject image in a real space and a position of the display in the real space that is obtained from the SLAM image, and
to display the subject image at the determined position.

7. The image display system according to claim 1, wherein
in response to failure to detect the marker from the SLAM image, the image controller is configured to determine the display position of the subject image within a display area of the display independently of a position of the subject image in a real space, and to display the subject image at the determined position.

8. An image display system, comprising:
a display configured to be attached to the head of a user that is an occupant of a vehicle, the display configured to display a subject image to be superimposed on a field of vision of the user;
a simultaneous localization and mapping (SLAM) camera fixed to the display to capture a SLAM image of surroundings of the display;
one or more light emitters disposed within a vehicle cabin, the one or more light emitters configured to emit light that serves as a marker;
an image controller configured to determine a display position of the subject image based on the SLAM image including the marker; and
an on-vehicle display disposed within the vehicle cabin, wherein
in response to failure to detect the marker from the SLAM image, the image controller is configured to display an image corresponding to the subject image on the on-vehicle display.

9. The image display system according to claim 1, wherein:
the marker is disposed at a position within the field of view of the user who is sitting on a driver's seat and driving a vehicle.

10. The image display system according to claim 1, wherein
the one or more light emitters comprise two or more light emitters spaced from each other, and
each of the two or more light emitters emits light that serves as the marker.

11. An image controller configured to control driving of a display configured to be attached to the head of a user that is an occupant of a vehicle, the display configured to display a subject image to be superimposed on a field of vision of the user, the image controller configured to:
cause one or more light emitters disposed within a vehicle cabin to emit light that serves as a marker;
cause a simultaneous localization and mapping (SLAM) camera fixed to the display to capture a SLAM image of surroundings of the display; and
determine a display position of the subject image based on the SLAM image including the marker,
wherein
the marker has a marker display condition including at least one of a luminance, a color, or a brightness, the marker display condition being variable, and
the marker display condition is changed in accordance with an environmental light condition in the vicinity of the one or more light emitters.

\* \* \* \* \*